US007195689B2

(12) United States Patent
Adams et al.

(10) Patent No.: US 7,195,689 B2
(45) Date of Patent: Mar. 27, 2007

(54) DOUBLE-SIDED LABELS AND METHODS OF MANUFACTURE AND USE

(75) Inventors: John E. Adams, Omaha, NE (US); David A. Dominiack, Papillion, NE (US); William R. Gillespie, Omaha, NE (US); Andrew W. Greenberg, Omaha, NE (US); Michael J. Kenealy, Council Bluff, IA (US); Neil O. Peters, Omaha, NE (US)

(73) Assignee: Nashua Corporation, Nashua, NH (US)

( * ) Notice: Subject to any disclaimer, the term of this patent is extended or adjusted under 35 U.S.C. 154(b) by 54 days.

(21) Appl. No.: 10/642,452

(22) Filed: Aug. 15, 2003

(65) Prior Publication Data

US 2005/0037172 A1 Feb. 17, 2005

(51) Int. Cl.
*B32B 38/04* (2006.01)
*B32B 38/14* (2006.01)

(52) U.S. Cl. ...................... 156/252; 156/268; 156/269; 156/277; 156/289; 156/290; 283/81; 283/101

(58) Field of Classification Search ................ 156/277, 156/289, 290, 269, 268, 252; 283/81, 101
See application file for complete search history.

(56) References Cited

U.S. PATENT DOCUMENTS 3,524,271 A 8/1970 Buske
3,524,782 A 8/1970 Buske
3,880,692 A 4/1975 Jeffries
3,973,788 A 8/1976 Pekko et al.
3,974,887 A 8/1976 Allen et al.
3,993,814 A 11/1976 Cavender
4,024,380 A 5/1977 Gunn
4,035,808 A 7/1977 Karp
4,060,168 A 11/1977 Romagnoli
4,068,028 A 1/1978 Samonides .................. 428/40
4,128,954 A 12/1978 White
4,188,427 A 2/1980 Grass .......................... 428/41
4,215,879 A 8/1980 Blum
4,301,878 A 11/1981 Soe
4,307,900 A 12/1981 Krautsack
4,321,103 A 3/1982 Lindstrom et al.
4,323,608 A 4/1982 Denny et al.
RE30,958 E 6/1982 White
4,345,393 A 8/1982 Price et al.
4,354,894 A 10/1982 Lewis et al.
4,415,048 A 11/1983 Teraoka
4,440,248 A 4/1984 Teraoka
4,479,838 A 10/1984 Dunsirn et al. ............. 156/247
4,627,641 A 12/1986 Kawaguchi
4,634,149 A 1/1987 Donovan
4,661,001 A 4/1987 Takai et al.
4,673,923 A 6/1987 Boscoe et al.

(Continued)

*Primary Examiner*—Nasser Ahmad
(74) *Attorney, Agent, or Firm*—Kirkpatrick & Lockhart Nicholson Graham LLP

(57) ABSTRACT

The invention generally relates to double-sided labels and methods of manufacture and use. More specifically, the invention relates to labels that include printed information on their front and back sides. The labels also include a detachable portion, which includes printed traces on its back side and is located between two portions of the label that contain adhesive on their back sides that permanently attach those portions to a product.

19 Claims, 8 Drawing Sheets

U.S. PATENT DOCUMENTS

| | | | | |
|---|---|---|---|---|
| 4,680,082 | A | 7/1987 | Kearney | |
| 4,699,833 | A | 10/1987 | Instance | |
| 4,700,976 | A | 10/1987 | Loose | |
| 4,708,368 | A | 11/1987 | Instance | |
| 4,712,929 | A | 12/1987 | Kitaoka | |
| 4,726,972 | A | 2/1988 | Instance | |
| 4,727,667 | A | 3/1988 | Ingle | |
| 4,744,161 | A | 5/1988 | Instance | |
| 4,747,619 | A | 5/1988 | Sager | |
| 4,763,930 | A | 8/1988 | Matney | |
| 4,767,654 | A | 8/1988 | Riggsbee | |
| 4,771,891 | A | 9/1988 | Sorensen et al. | |
| 4,809,905 | A | 3/1989 | Goodman | |
| 4,850,613 | A | 7/1989 | Instance | |
| 4,930,812 | A | 6/1990 | Howard | |
| 4,932,485 | A | 6/1990 | Mori | 177/25.15 |
| 4,960,482 | A | 10/1990 | Crane et al. | |
| 5,019,436 | A | 5/1991 | Schramer et al. | |
| 5,031,939 | A | 7/1991 | Webendorfer et al. | |
| 5,044,669 | A | 9/1991 | Berry | |
| 5,133,827 | A | 7/1992 | Ratermann | |
| 5,147,699 | A | 9/1992 | Browning et al. | |
| 5,172,936 | A | 12/1992 | Sullivan et al. | 283/81 |
| 5,203,591 | A | 4/1993 | Treat | |
| RE34,366 | E | 9/1993 | Instance | |
| 5,299,834 | A | 4/1994 | Kraige | |
| 5,308,120 | A | 5/1994 | Thompson | |
| 5,324,078 | A | 6/1994 | Bane | |
| 5,328,208 | A | 7/1994 | Garrison | |
| 5,342,093 | A | 8/1994 | Weernink | |
| 5,343,647 | A | 9/1994 | Bulka | |
| 5,346,739 | A | 9/1994 | Nassoiy | |
| 5,413,384 | A | 5/1995 | Principe et al. | 283/81 |
| 5,427,640 | A | 6/1995 | Daniels | |
| 5,441,796 | A | 8/1995 | Steidinger et al. | |
| 5,468,535 | A | 11/1995 | Amano | |
| 5,472,756 | A | 12/1995 | Sechet | |
| 5,520,760 | A | 5/1996 | Freedman | |
| 5,520,990 | A | 5/1996 | Rotermund | |
| 5,540,148 | A | 7/1996 | Oumiya et al. | |
| 5,556,026 | A | 9/1996 | Blankitny | |
| 5,569,515 | A | 10/1996 | Rice, II et al. | |
| 5,578,797 | A | 11/1996 | Hewitt et al. | |
| 5,582,889 | A | 12/1996 | Pedrini | |
| 5,591,290 | A | 1/1997 | Walter et al. | |
| 5,601,314 | A | 2/1997 | Burns et al. | |
| 5,618,600 | A | 4/1997 | Denklau | |
| 5,679,427 | A | 10/1997 | Instance | |
| 5,691,437 | A | 11/1997 | Main | |
| 5,700,537 | A | 12/1997 | Instance | |
| 5,702,127 | A * | 12/1997 | Korondi, Jr. | 283/81 |
| 5,709,918 | A | 1/1998 | Kimijima et al. | |
| 5,716,688 | A | 2/1998 | Burke et al. | 428/43 |
| 5,720,499 | A | 2/1998 | Sakashita | |
| 5,752,723 | A | 5/1998 | Robertson | |
| 5,775,735 | A | 7/1998 | Bolnick et al. | |
| 5,776,571 | A | 7/1998 | Michlin et al. | |
| 5,827,389 | A | 10/1998 | Takizawa et al. | |
| 5,829,789 | A | 11/1998 | Treleaven et al. | 283/81 |
| 5,836,697 | A | 11/1998 | Chiesa | |
| 5,863,628 | A | 1/1999 | Barry | |
| 5,895,075 | A | 4/1999 | Edwards | |
| 5,897,722 | A | 4/1999 | Bright | |
| 5,897,741 | A | 4/1999 | Mills et al. | |
| 5,940,305 | A | 8/1999 | Wurz | |
| 5,944,357 | A | 8/1999 | Instance | |
| 5,955,166 | A | 9/1999 | Murphy | 428/40.1 |
| 5,958,536 | A | 9/1999 | Gelsinger et al. | |
| 5,971,437 | A | 10/1999 | Sakashita | |
| 5,989,707 | A | 11/1999 | Takizawa et al. | |
| 6,000,726 | A | 12/1999 | Campbell | |
| 6,004,643 | A | 12/1999 | Scheggetman | |
| 6,010,156 | A | 1/2000 | Block | |
| 6,016,618 | A | 1/2000 | Attia et al. | |
| 6,071,583 | A | 6/2000 | Pomerantz | |
| 6,085,818 | A | 7/2000 | Takizawa et al. | |
| 6,096,397 | A | 8/2000 | Murphy | 428/40.1 |
| 6,113,271 | A | 9/2000 | Scott et al. | |
| 6,116,654 | A | 9/2000 | Grootveld | |
| 6,117,264 | A | 9/2000 | Brewster | |
| 6,149,518 | A | 11/2000 | Farrow | |
| 6,174,402 | B1 | 1/2001 | Nakano et al. | |
| 6,209,920 | B1 | 4/2001 | Fabel | |
| 6,217,966 | B1 | 4/2001 | Finster et al. | |
| 6,235,376 | B1 | 5/2001 | Miyazaki et al. | |
| 6,254,137 | B1 | 7/2001 | Baum, Jr. et al. | |
| 6,254,952 | B1 | 7/2001 | Fox et al. | |
| 6,270,871 | B1 | 8/2001 | Scholz et al. | 428/40.1 |
| 6,272,780 | B1 | 8/2001 | Satamian | |
| 6,273,987 | B1 | 8/2001 | Wilkey | |
| 6,290,262 | B1 | 9/2001 | Petkovsek | |
| 6,329,034 | B1 | 12/2001 | Pendry et al. | |
| 6,332,631 | B1 | 12/2001 | Kirk | |
| RE37,521 | E | 1/2002 | Laurash et al. | |
| 6,358,353 | B1 | 3/2002 | Maliner | |
| 6,364,364 | B1 | 4/2002 | Murphy | |
| 6,379,742 | B1 | 4/2002 | Behm et al. | 427/7 |
| 6,383,593 | B1 | 5/2002 | Fabel | |
| 6,409,871 | B1 | 6/2002 | Washburn et al. | |
| 6,410,111 | B1 | 6/2002 | Roth et al. | |
| 6,410,112 | B1 | 6/2002 | Hatfield | 428/40.1 |
| 6,410,113 | B1 | 6/2002 | Roth | |
| 6,420,006 | B1 | 7/2002 | Scott | |
| 6,447,862 | B1 | 9/2002 | Rankin et al. | |
| 6,461,727 | B1 | 10/2002 | Lauer et al. | |
| 6,485,803 | B1 | 11/2002 | Bright | |
| 6,491,995 | B1 | 12/2002 | Schreiner | |
| 6,495,228 | B1 | 12/2002 | Mauch et al. | |
| 6,544,925 | B1 | 4/2003 | Prusik et al. | |
| 6,547,914 | B2 | 4/2003 | Schnitzer et al. | |
| 6,613,410 | B1 | 9/2003 | Sellars | 428/40.1 |
| 6,669,804 | B2 | 12/2003 | Pendry et al. | 156/252 |
| 6,733,855 | B1 | 5/2004 | Scott | 428/40.1 |
| 6,770,345 | B2 | 8/2004 | Sellars | 428/40.1 |
| 2001/0036524 | A1 | 11/2001 | Anderson | |
| 2002/0015813 | A1 | 2/2002 | Pendry et al. | |
| 2002/0079691 | A1 | 6/2002 | Zumberge | |
| 2002/0090479 | A1 | 7/2002 | Jacob et al. | |
| 2002/0090482 | A1 | 7/2002 | Motomiya | |
| 2002/0093189 | A1 | 7/2002 | Krupa | |
| 2002/0108706 | A1 | 8/2002 | Roth et al. | |
| 2002/0116267 | A1 | 8/2002 | Weisz et al. | |
| 2002/0134497 | A1 | 9/2002 | Roth | |
| 2002/0181147 | A1 | 12/2002 | Tokunaga et al. | |
| 2003/0012911 | A1 | 1/2003 | Campbell | |
| 2003/0020274 | A1 | 1/2003 | Milliron | |
| 2003/0034645 | A1 | 2/2003 | Dronzek, Jr. et al. | |
| 2003/0035014 | A1 | 2/2003 | Adams et al. | |
| 2003/0039786 | A1 | 2/2003 | Milliorn et al. | |
| 2003/0091819 | A1 | 5/2003 | Franko, Sr. | |
| 2003/0173118 | A1 | 9/2003 | Schuller | 177/25.15 |
| 2003/0218330 | A1 | 11/2003 | Mortimer | 283/81 |
| 2004/0049422 | A1 | 3/2004 | Mortimer | 705/14 |
| 2005/0055637 | A1* | 3/2005 | Schuller | 715/526 |
| 2005/0154641 | A1 | 7/2005 | Mortimer | 705/14 |

* cited by examiner

DOUBLE-SIDED LABELS AND METHODS OF MANUFACTURE AND USE

FIELD OF THE INVENTION

The invention generally relates to double-sided labels and methods of manufacture and use. More specifically, the invention relates to labels that include printed traces on their front sides and a detachable portion that non-permanently attaches to a product and includes printed traces on its back side.

BACKGROUND OF THE INVENTION

Marketing programs are continually being developed, some of which rely on providing consumers with information directly on a product. Information often is attached to a product via a label. The information may include specific product information, e.g., ingredients, weight, directions for use, and cost. The information also may include market-related information such as advertising, recipes and coupons. Because the size of the product and/or the size of the label may be limited, efficient use of the label space is necessary to maximize the information available to the consumer. Further, it may be desirable for a label to have a detachable portion so that a consumer can immediately use a portion of the label, e.g., a coupon redeemed at checkout, or save a portion of the label for future reference, e.g., a recipe. Accordingly, there is a need in the art for labels having printing on both their front side and their back side where a portion of the label can be removed.

SUMMARY OF THE INVENTION

A label now has been developed that has printed information on its front side and on at least a portion of its back side that is adapted to non-permanently contact a product and be detached. The labels of the invention permit efficient use of the label space, increasing the surface area that can contain useful consumer information. In addition, the labels of the invention permit a consumer to detach a portion of the label that contains printed information on its back side so that the information can be used immediately or retained for future use or reference. The invention also includes methods of making and using the labels of the invention.

In one aspect, the invention features a label having a front side and a back side, where the label includes a first portion, a second portion, and a third portion. The front side of the label includes printed information on at least one of the portions of the label. The first portion of the label has printed information on its back side, where the back side of the first portion is adapted to non-permanently contact a product. The second portion of the label is proximate to the first portion of the label and has an adhesive disposed on its back side that is adapted to permanently attach the second portion to a product. The third portion of the label also is proximate to the first portion of the label and has an adhesive disposed on its back side that is adapted to permanently attach the third portion of the label to the product. In addition, the first portion of the label is adapted to be detached from the second portion of the label, the third portion of the label, or both the second and third portions of the label. In certain embodiments, perforations are disposed through the interface between the first portion and the second portion and the interface between the first portion and the third portion, which facilitate detachment. Prior to use, the label typically includes a release liner that is in contact with the back side of the label.

In certain embodiments, the printed information is thermally printed. In other embodiments, the adhesive may be a pressure sensitive adhesive. Useful pressure sensitive adhesives may be designed to work within a range of temperatures, e.g., freezer or refrigerator temperatures. In yet other embodiments, the back side of the first portion includes a deadening agent that contacts at least a portion of the adhesive disposed on the back side of the first portion of the label. The deadening agent may be an ultraviolet-cured material.

In another aspect, a release liner is removed from the back side of the label and the label is applied to a product. The adhesive on the second portion and the third portion of the label permanently attach to the product and the back side of the first portion of the label non-permanently contacts the product.

In yet another aspect, the invention features a method of making a label of the invention. The method generally includes: providing a substrate having a front side and a back side, where the back side includes an adhesive; deadening a first portion of the back side of the substrate to create a deadened first portion; applying an ink which may be colored to the deadened first portion; contacting the back side of the substrate with a release liner; applying an ink, which may be colored, to the front side of the substrate; and forming a label where the back side of the label includes the deadened first portion, a second portion and a third portion, each proximate to the first portion and including an adhesive. In certain embodiments, at least a portion of the interface between the first portion of the substrate and the second portion of the substrate is perforated and at least a portion of the interface between the first portion of the substrate and the third portion of the substrate is perforated. When the substrate is cut, e.g., to form perforations, the cut typically does not extend all the way through the release liner.

DESCRIPTION OF THE DRAWINGS

The invention is pointed out with particularity in the appended claims. The drawings are not necessarily to scale, emphasis instead generally being placed upon illustrating the principles of the invention. The advantages of the invention can be better understood by reference to the description taken in conjunction with the accompanying drawings.

Figure 1A:
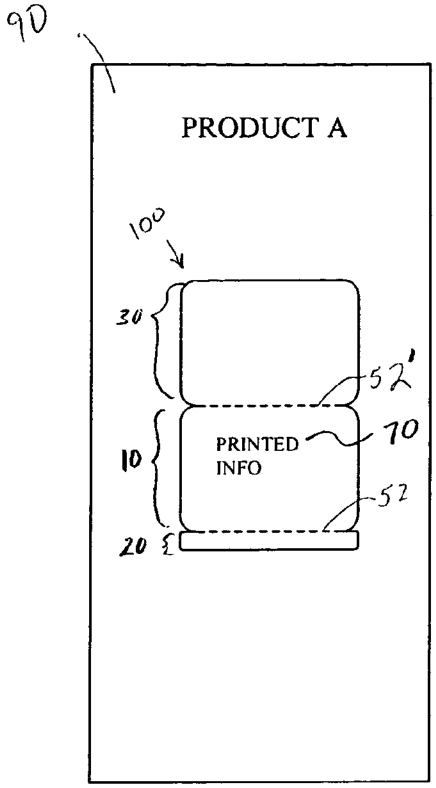
FIG. 1A is a plan view of an embodiment of a label of the invention attached to a product.

FIG. IC is a plan view of the back side of the first portion of the label of FIG. 1A, which has been detached from the second and third portions of the label, and the product.

Figure 2:
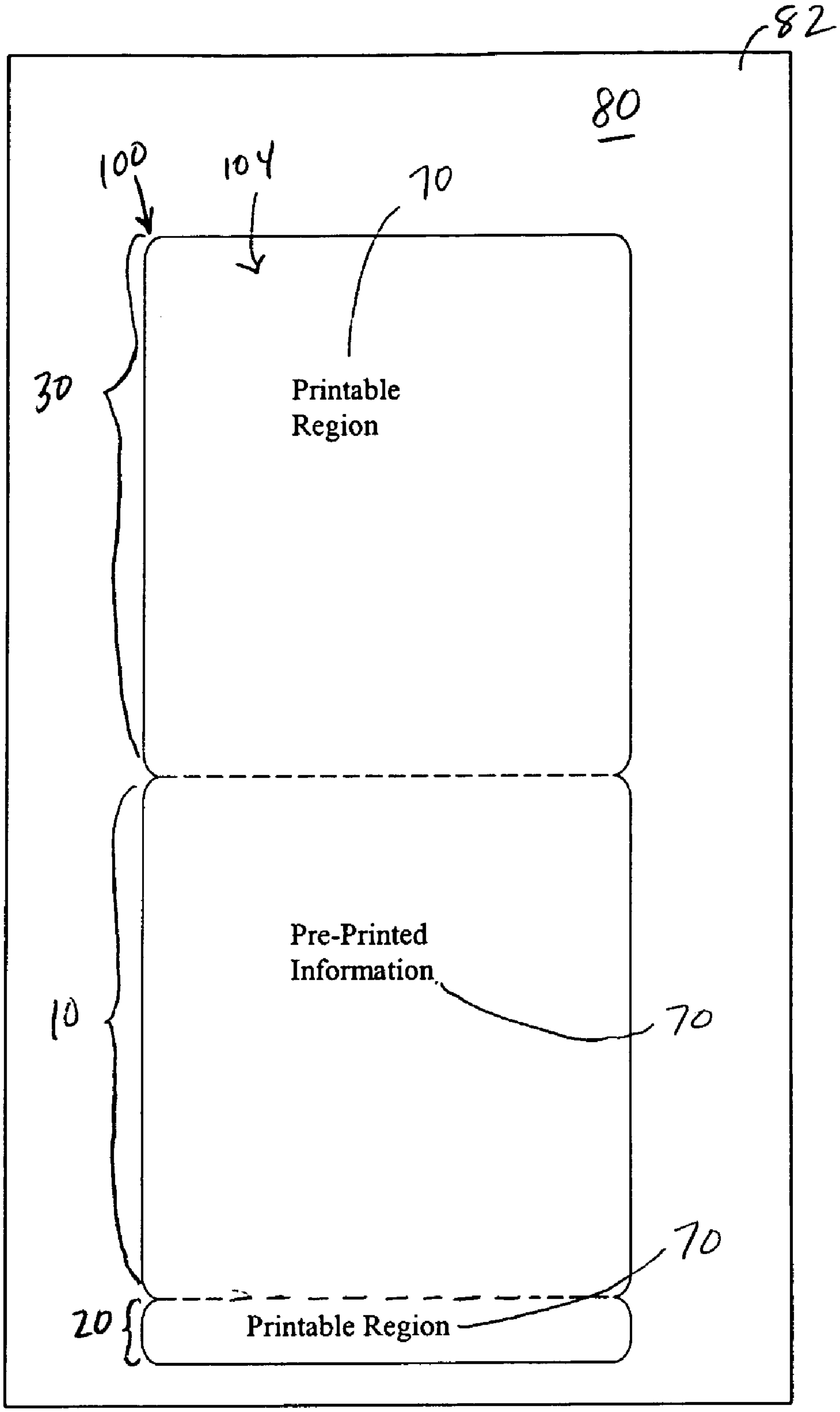

FIG. 2 is a plan view of the front side of an embodiment of a label of the invention.

Figure 3:
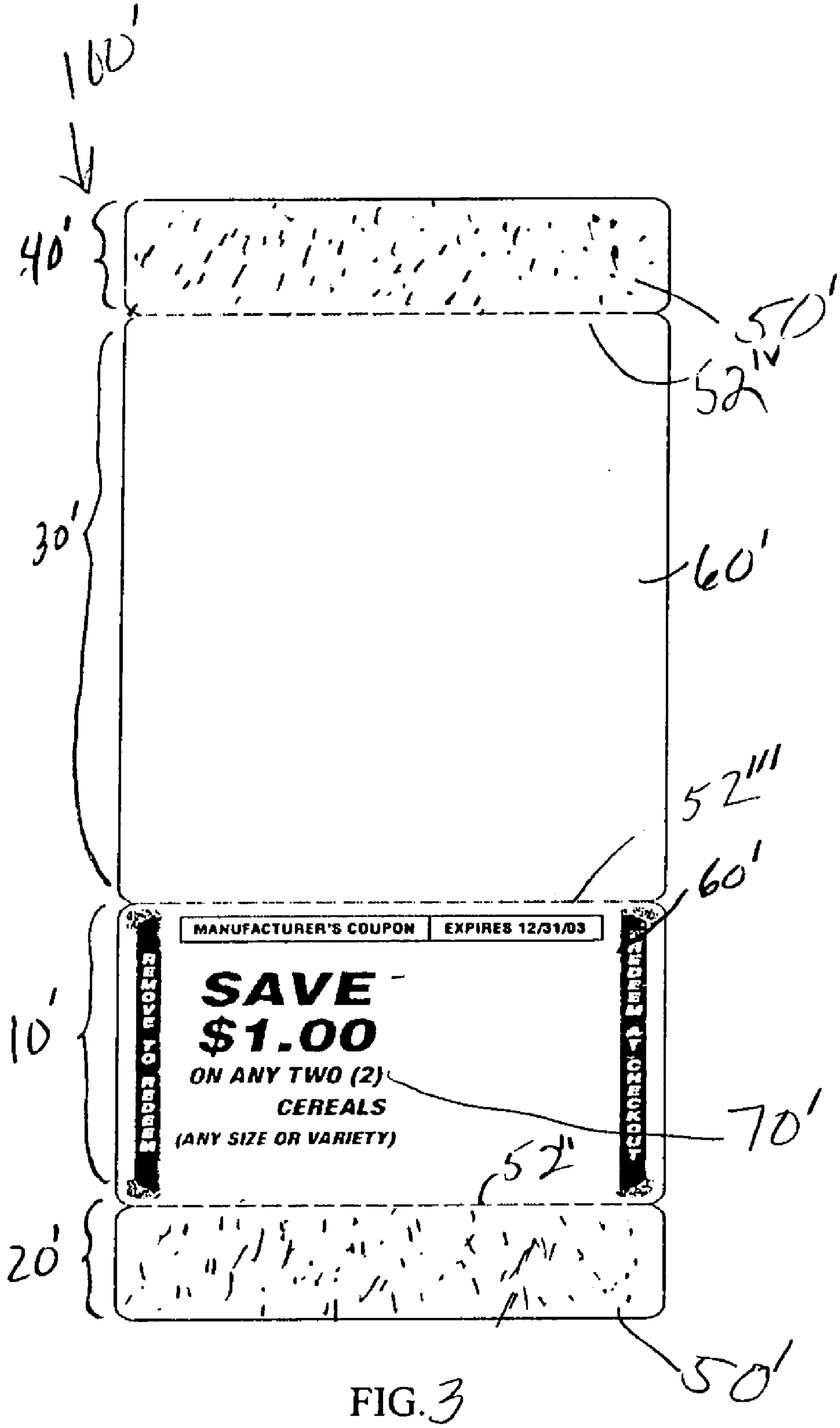

FIG. 3 is a plan view of the back side of a label.

Figure 4A:
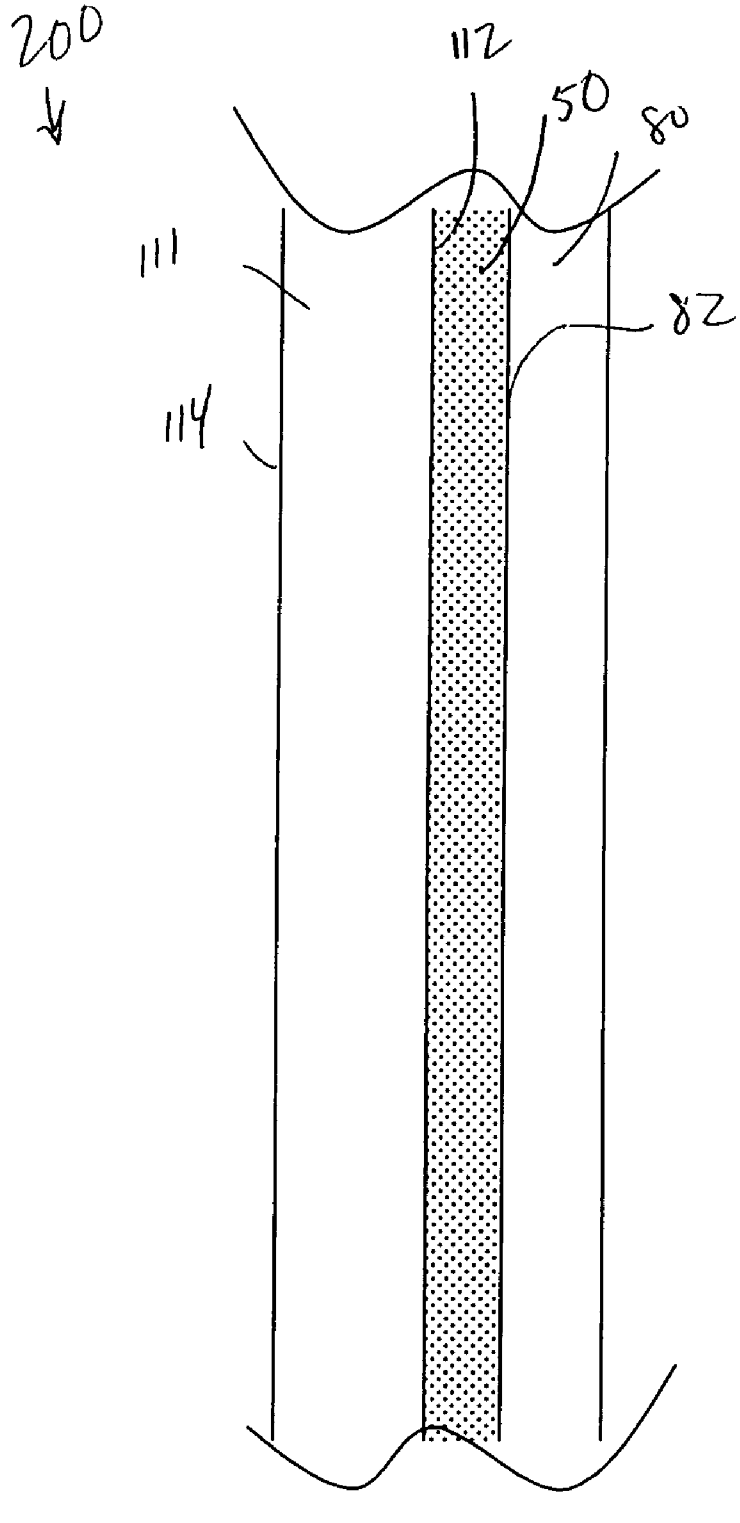

FIG. 4A is cross section of an embodiment of a label of the invention including a substrate and a release liner.

Figure 4B:
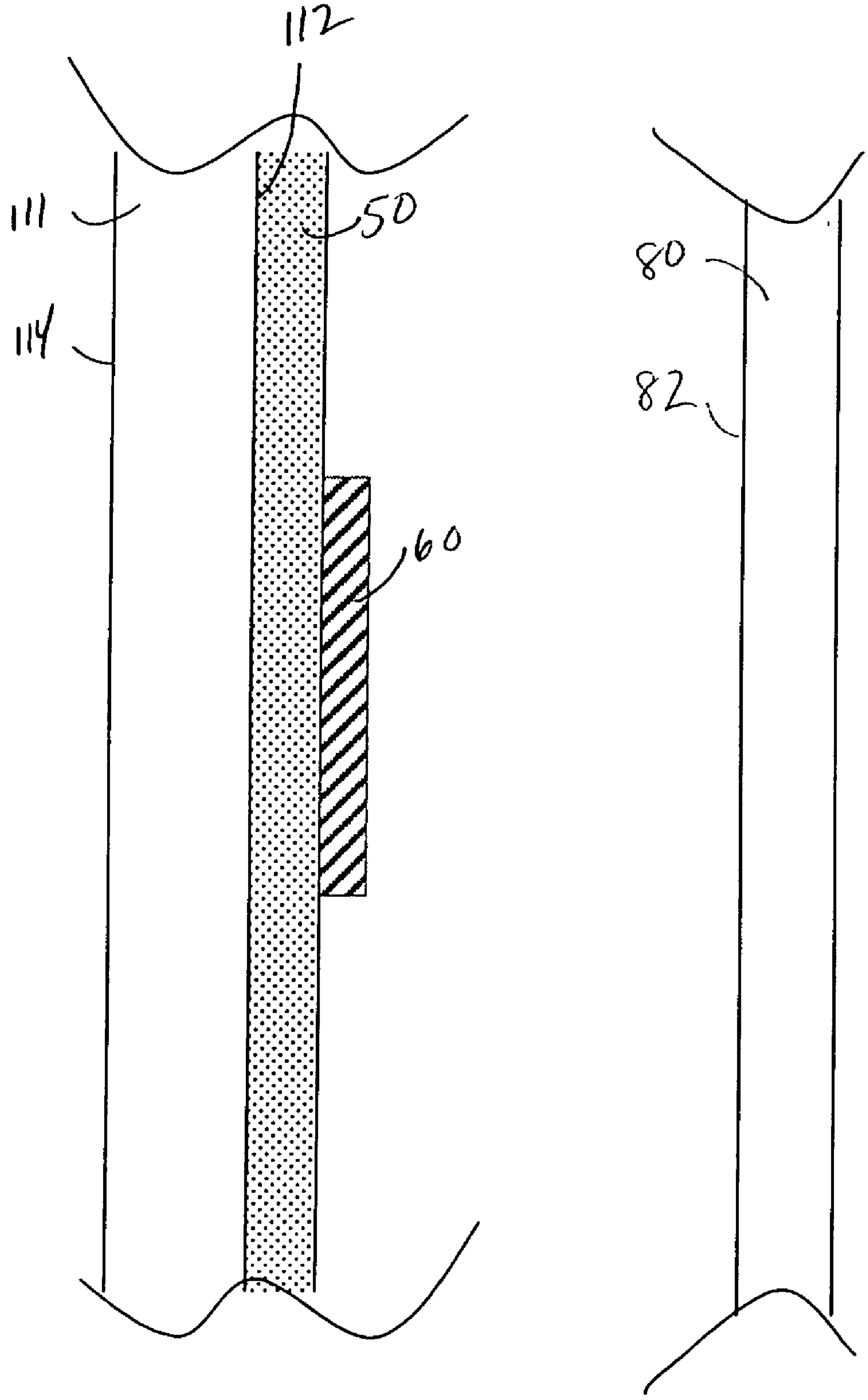

FIG. 4B is a cross section of the label of FIG. 4A, where the release liner has been separated from the substrate.

Figure 5:
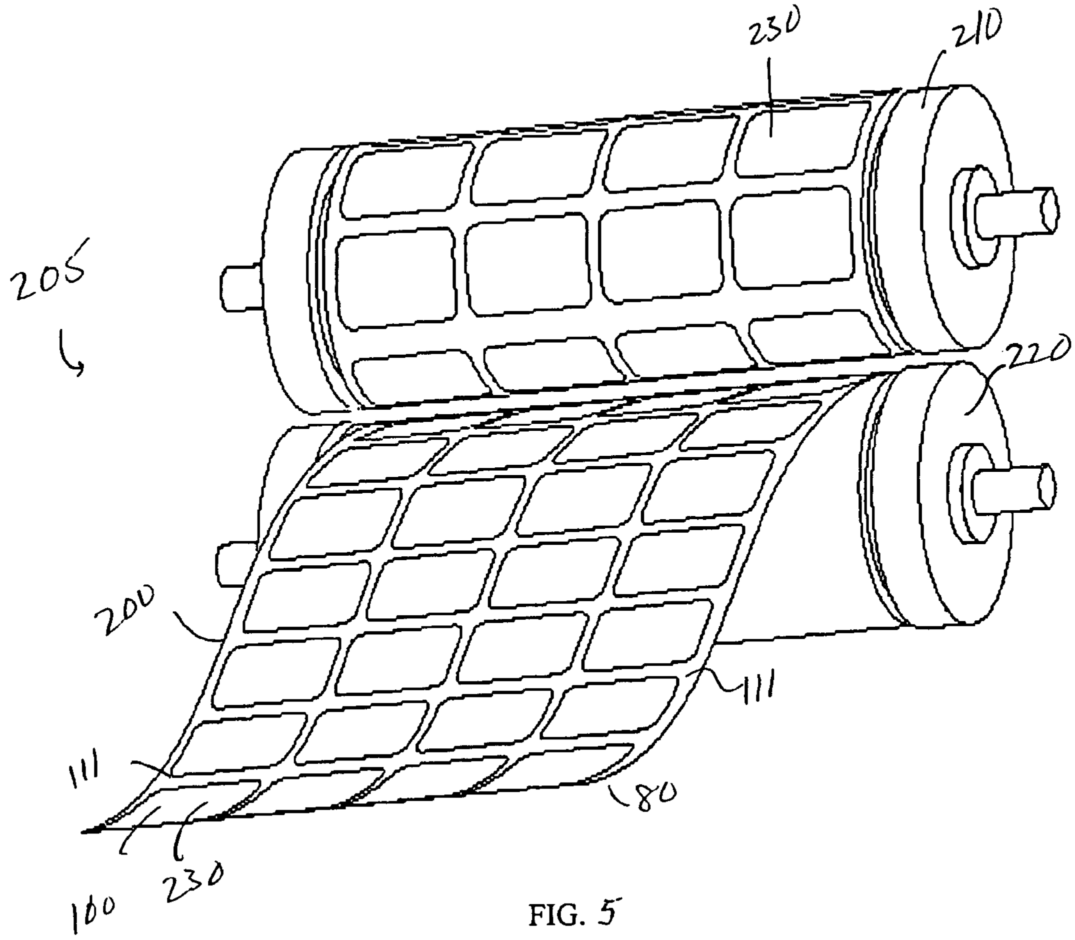

FIG. 5 is a schematic of a rotating cylinder die cutting tool, which may be used to form labels of the invention.

Figure 6:
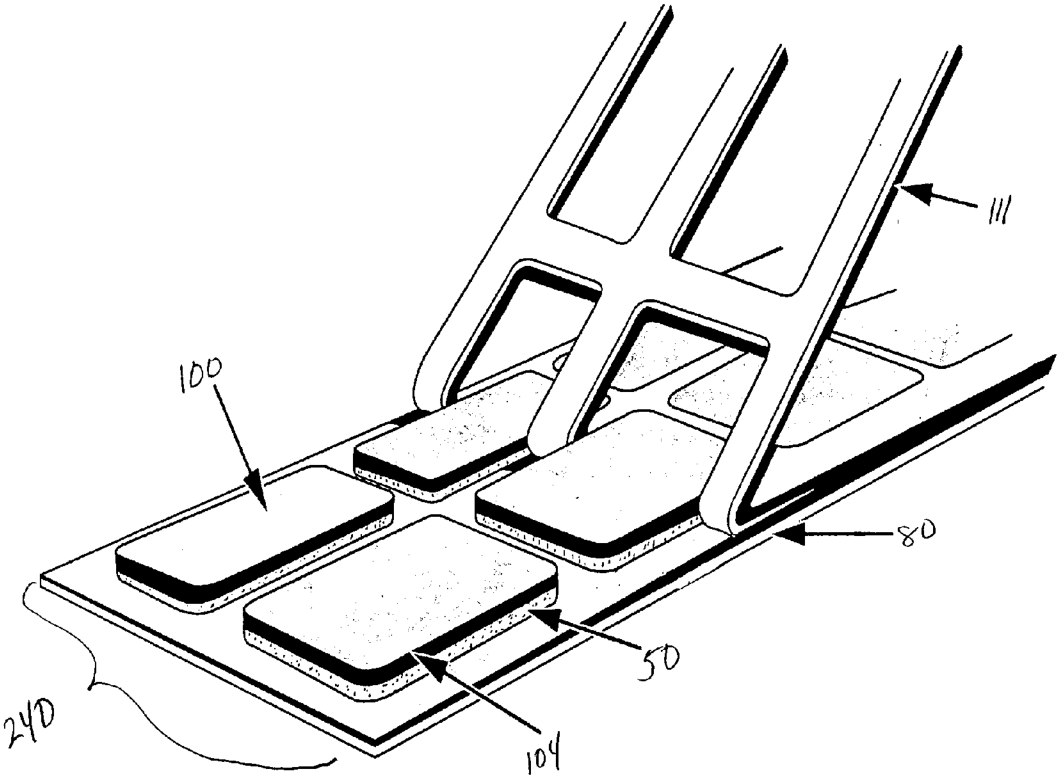

FIG. 6 is a schematic of embodiments of labels of the invention.

Figure 7:
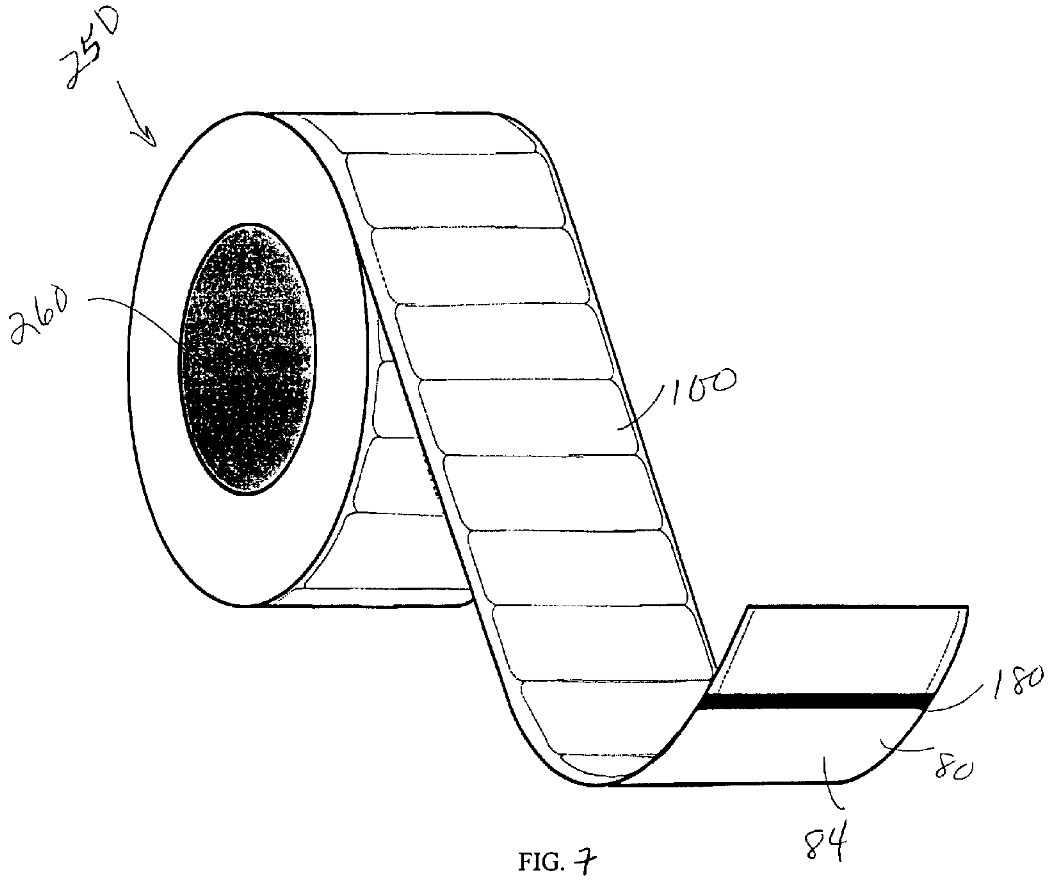

FIG. 7 is schematic of a roll of embodiments of labels of the invention.

Like reference characters in the respective drawn figures indicate corresponding parts.

DETAILED DESCRIPTION OF THE INVENTION

The invention relates to labels that include a front side and a back side; and at least a first portion, a second portion, and a third portion; where the back side of the a first portion of the label is adapted to non-permanently contact a product and contains printed traces, and the back sides of the second portion and the third portion are adapted to permanently attach to a product. As used herein, "permanently attached" refers to being attached to product such that the detachable portion of the label can be removed from the other portions of the label without the other portions also being completely removed from the product. In other words, removal of the portion of a label that is permanently attached is difficult, but may be accomplished, e.g., by scraping the label using excessive force, or using chemicals. The label also includes printed information on its front side. Methods of making the label are also disclosed.

Throughout the description, where compositions are described as having, including, or comprising specific components, or where processes are described as having, including, or comprising specific process steps, it is contemplated that compositions of the present invention also consist essentially of, or consist of, the recited components, and that the processes of the present invention also consist essentially of, or consist of, the recited processing steps.

It should be understood that the order of steps or order for performing certain actions are immaterial so long as the invention remains operable. Moreover, two or more steps or actions may be conducted simultaneously.

FIG. 1A shows an exemplary label 100 disposed on a product 90. The label 100 includes a first portion 10, a second portion 20, and a third portion 30. The interface between the first portion 10 and the second portion 20 includes perforations 52. Similarly, the interface between the first portion 10 and the third portion 30 includes perforations 52$^{I}$. The perforations may be cuts or apertures extending through the label. The front portion of the label may include printed information 70, e.g., on the first portion.

Figure 1B:
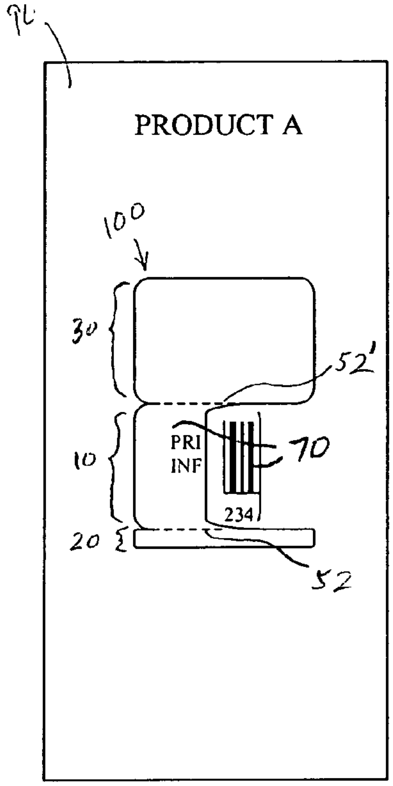
FIG. 1B is a plan view of the label of FIG. 1A, where a first portion is shown being detached from the second and third portions of the label, and the product.
Figure 1C:
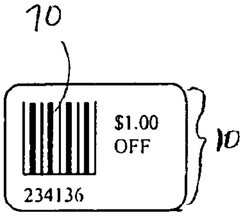

As shown in FIG. 1B the first portion 10 may be peeled back from the second and the third portions 20, 30 to reveal printed information 70 on the back side of the first portion 10. As shown in FIG. 1C, the first portion 10 may be pulled away and detached from the second and the third portions 20, 30 and from the product 90. Perforations disposed through the label typically guide how the first portion peels and detaches from the second and third portions. In use, the printed information on the back side of the first portion, e.g., a discount offer, may be processed after the first portion is detached from the remaining portions of the label.

A label may be composed of materials known in the art for making papers and labels. Materials employed to make the labels include paper that is laminated together, e.g., two or more types of paper may be laminated together to form the materials employed to make the labels. Suitable papers that may be employed include, but are not limited to, Fasson® 50# Semi-Gloss, Fasson® Direct-Therm 200HD, and Fasson® DT 200NIR papers available from Fasson® Roll North America (Painesville, Ohio). Other suitable papers may be available from other manufacturers known to the skilled person, including MACtac® (Stow, Ohio) and RICOH Electronics, Inc. (Duluth, Ga.).

In certain embodiments, at least one layer of paper is a thermally activated paper. Suitable thermal activated papers include coatings or other materials that change color in a precise area upon application of heat in a controlled manner. In one embodiment, upon application of heat to the thermal paper, an image that is blue and/or black is generated. Suitable thermal activated papers that may be employed include, but are not limited to, Fasson® Direct-Therm 300HD, Fasson® DT700HD papers available from Fasson® Roll North America (Painesville, Ohio). Alternatively, a thermal coating may be applied to paper used in a label. Various thermal papers and thermal coatings alter the color of the image and the temperature at which the thermal properties activate. In use, a thermal scale printer may be employed to apply heat to an area of the label to achieve a variable printed image. A low voltage print head or, alternatively, a high speed thermal printer may be employed to create an image on the thermal label. The precise area of the heat can form both alphanumerical and pictoral images, e.g., a bar code, on the thermally activated paper. The type of thermal activated paper, the temperature control and the area and the quality of the printing may be selected to achieve a desired label image.

A label may include printing on all or particular portions of its front side and/or its back side. As used herein, printing may include any colored ink printed on the label. Suitable inks that may be employed include liquid based inks, e.g., solvent-based or water-based inks, such as, e.g., AQUAVERSE® water flexo inks available from Sun Chemical Inc (GPI) (Kansas City, Mo.) and Ultra Gloss Plus Proset, ULTRA GLOSS™ and Ultra Plus Proset available from Water Ink Technologies, Inc. (Lincolnton, N.C.).

In some embodiments, printing on the front side defines printed information. Printed information includes one or more combinations of alphanumeric symbols, such as, words, offers, recipes, coupons, nutritional information and pictoral images, e.g., a bar code or a photograph of a product. A complementary product offered at a discount may be pictured on the front side of a label that is adhered to a product. Similarly, the back side of the detachable portion of the label may include printed information.

A label may be printed using printing techniques known in the art for printing inks on paper and other substrates. Portions of the label may be preprinted and other portions may be printed on-site. Portions of the label may be printed just prior to being applied to a product. Printing techniques that may be employed include, but are not limited to, weigh scale printers, offset-lithographic (wet, waterless and dry), flexographic, rotogravure (direct or offset), intaglio, ink jet, electrophotographic (laser jet and photocopy), thermal and letterpress printing. Personal printers, e.g., ink jet and laser jet printers, also can be used to print information on substrates in accordance with the present invention.

In certain embodiments, a label includes preprinted information on the front side and/or back side of the first portion, and the front sides of the second portion and the third portion are printable regions that may be printed on-site, e.g., with a weigh scale printer.

Adhesive is disposed on the back side of the label, e.g., on the back side of the second portion and the third portion. The adhesive enables the label to be permanently or removably attached to a product. Suitable adhesives include, but are not limited to, pressure sensitive adhesives, such as Fasson® S2501, Fasson® FA20-B, Fasson® S4600 and Fasson® AT20 available from Fasson® Roll North America (Painesville, Ohio). In some embodiments, e.g., a label for a product stored in a freezer, an adhesive designed to work at freezer temperatures is employed. Suitable adhesives that work at freezer temperatures include, but are not limited to, Fasson® AT20 available from Fasson® Roll North America (Painesville, Ohio). Other suitable adhesives may be available from other manufacturers known to the skilled person, including MACtac® (Stow, Ohio) and RICOH Electronics, Inc. (Duluth, Ga.).

In accordance with the invention, where the back side of the first portion non-permanently attaches to a product, a portion of an adhesive initially on the back side may be deadened using detackifying materials such as fluid-based coatings. Suitable deadening materials may be water based or solvent based. Deadening materials include, but are not limited to, UV Gloss Coating KCG00279R, an ultra violet deadening coating available from Sun Chemical Inc (GPI) (Kansas City, Mo.), and Litho HV Super Adhesive Deadener available from Water Ink Technologies, Inc. (Lincolnton, N.C.). The deadening material may be a clear or, it may be a colored fluid material. In one embodiment, pigment is added to a clear deadening material with the other properties of the deadening material not otherwise affected. In one embodiment, the deadening material is a liquid based ink material that is colorless. The deadening material may be hot air dried e.g., by exposing the deadening material to heat and moving air.

Alternatively, the deadening material may be cured upon exposure to ultraviolet light. Ultraviolet cured ink changes the molecular state of a liquid ink to a solid state upon exposure to ultraviolet light. A preferred deadening material is UV Gloss Coating KCG00279R available from Sun Chemical (Kansas City, Mo.). In some embodiments, the ultraviolet deadening material is disposed over an adhesive on the back side of the first portion. Subsequently, the deadening material is exposed to ultraviolet light, which cures the deadening material. Thereafter printed information can be printed over the deadened portion of the label. The printed information may be printed with an ultraviolet curable ink.

The back side of the label may include printed traces, e.g., printing with colored ink. In some embodiments, the back side of the first portion includes printed information, such as alphanumeric characters or pictoral images, e.g., a bar code. For example, information can be printed over the adhesive on the back side of the first portion according to any printing methods known in the art, including the techniques described above. Deadening material may be applied prior to or after the printed information is disposed on the back side of the first portion of label. Deadening material may be applied to the label by a variety of techniques known in the art including the printing techniques described above. In one embodiment, the deadening material is applied over the printed information according to a flexography printing process. A clear deadening material is employed to allow the printed information to be visible through the deadening material. In another embodiment, the deadening material is evenly applied over the entire back side of the first portion.

Referring now to FIG. 2, a label 100 having a first portion 10, a second portion 20, and a third portion 30 may be laminated to a release liner 80. Specifically, the adhesive, disposed on the back side of the label, contacts the release liner. Suitable release liners are made from materials including, but not limited to, Fasson® 40# SCK and Fasson® 50# SCK and available from Fasson® Roll North America (Painesville, Ohio). Other suitable release liners may be available from other manufacturers known to the skilled person, including MACtac® (Stow, Ohio) and RICOH Electronics, Inc. (Duluth, Ga.). At least a portion of the release liner may be coated with a release material, e.g., a silicon based coating. In one embodiment, the first side of the release liner is coated with a silicon based coating. In another embodiment, both the first side and the second side (not shown) of the release liner are coated with silicon based coating. In one embodiment, a single layer of silicon is disposed on the first side of the release liner.

The label typically is laminated to the release liner so the adhesive on the back side of the label is protected from contamination by substances, e.g., dust, that might reduce the adhesive properties of the label. Further, the release liner enables the label to be printed using one or more printing techniques without the adhesive on the back side of the label becoming adhered to the printing apparatus. Additionally, the release liner can enable the label to be properly aligned and positioned in a printer for printing.

The back side of the first portion of the label is deadened and the back side of the second and the third portions include an adhesive. When the release liner is laminated to the back side of the label, the first portion non-permanently contacts the release liner and the adhesive of the second and third portions are protected by the release liner. In embodiments where the back side of the first portion is covered with deadened material, the second and third portions may be sized so they are sufficiently large to hold the label onto the release layer with such strength to avoid the label peeling from the release layer when the label is printed. The release liner may be removed from the label just prior to application on a product.

In other embodiments, deadening material is applied over the majority of the back side of the first portion, but one or more areas of active adhesive remain. The remaining areas of active adhesive on the back side of the first portion prevent the label from moving such that it remains held onto the release liner and does not fold back during printing. Additionally, the areas of active adhesive may be sized to avoid difficulty in peeling the first portion of the label away from the second and third portions.

FIG. 3 shows another embodiment of a label 100' including a first portion 10', a second portion 20', a third portion 30', and a fourth portion 40'. In one embodiment, deadening material 60' is disposed on the back side of the first portion 10' and on the back side of the third portion 30'. Adhesive 50' is disposed on the back side of both the second portion 20' and the fourth portion 40'. At least a portion of the interface between the first portion 10' and the second portion 20' and the first portion 10' and the third portion 30' includes perforations $\mathbf{52}^{II}$ and $\mathbf{52}^{III}$, respectively. In one embodiment, at least a portion of the interface between the third portion 30' and the fourth portion 40' includes perforations $\mathbf{52}^{IV}$. The back side of the label may be laminated to a release sheet (not shown). When the label is positioned on a product the first portion and/or the third portion may be pulled away and then detached from the second and fourth portions of the label.

According to exemplary methods of making a label of the invention, FIG. 4A shows a substrate 111 and a release liner 80 that forms a laminate 200, which often is employed initially in the process. The substrate 111 has a front side 114 and a back side 112. Adhesive 50 is disposed on the back side 112 of the substrate 111, which is laminated to a release liner 80. The first side 82 of the release liner 80 that is adjacent the back side 112 of the substrate 111 is typically coated with a release material. Suitable laminates that may be employed include, but are not limited to, Fasson® Specification number 14472, which includes a substrate of 50# Semi-Gloss paper disposed on the back side with the adhesive AT20, which is laminated to release liner 40# SCK, Fasson® Specification number 15852, which includes a substrate of Direct-Therm 200HD paper disposed on the back side with the adhesive AT20, which is laminated to release liner 40# SCK, and Fasson® Specification number 16394, which includes a substrate of DT700HD paper disposed on the back side with the adhesive S2501, which is laminated to release liner 40# SCK. Other suitable laminates available from Fasson® include Specification numbers: 14613, 15582, 15862, 17134, 17135, 17136, 17137, 17138, 17139, 17142, 17305, 17729, 18107, 18398, 18399, 19391. During the process of making the label, the release liner is separated from the substrate to reveal the back side disposed with adhesive.

As shown in FIG. 4B, a deadening material 60 is applied to a portion of the adhesive 50 on the back side 112 of the substrate 111. The deadening material may be dried by using heat and/or moving air. Alternatively, where the deadening material is an ultraviolet curable material, the deadening material is cured upon exposure to ultraviolet light. The back side of the substrate then may be printed, e.g., with printed information. In some embodiments, the printing ink is dried upon exposure to heat and/or moving air or ultraviolet light. The back side of the substrate may be printed prior to or subsequent to deadening. Thereafter, the back side of the substrate may be reunited with the release layer and relaminated.

The front side of the laminate substrate may be preprinted. Alternatively, the front side of the laminate substrate may be printed prior to separating the substrate from the release layer or after the laminate is reunited. Multiple printing inks and/or colors may be applied to the front side of the substrate.

FIG. 5 illustrates a rotating cylinder die cutting tool 205. The cutting tool is designed to form the shape of the label 100 by cutting into the substrate layer 111 and typically penetrating and not cutting through the release liner 80. The die cutting tool 205 includes a die cylinder 210, which is a rotating cylinder engraved with multiple copies of a label design 230. In one embodiment, the die cylinder has multiple label designs to create multiple label shapes. The die cutting tool also includes a smooth cylinder 220, which may rotate in either the same or the opposite direction of the die cylinder 210. As the laminate 200 passes through the die cutting tool 205 the die cylinder label design contacts and cuts the substrate, typically, without cutting the release liner, thereby forming the labels in the shape of the label design.

FIG. 6 illustrates excess substrate 111 being removed from the release liner 80 to reveal the array of labels 100 created by the die cutting tool. The labels 100 may remain on the release liner 80 in an array 240. Alternatively, the release liner having an array of labels may be cut into smaller widths.

Referring now to FIG. 7, a smaller width of a label array may be shaped into a roll 250 having a single label 100 in each row. In the depicted embodiment, labels 100 in the roll 250 are rolled around a core 260 and a guide line 180 is printed on the second side 84 of the release liner 80. In one embodiment, the guide line runs horizontally across the width of the release liner. In another embodiment, the guide line runs vertically along the length of the release liner. The guide line may be used to position the label in a specific position when a printing technique is being performed. For example, the guide line may be used to position the label in a specific position in a scale printer.

Suitable inks that may be employed to dispose the guide line on the release liner include liquid inks, including water based and solvent based inks. The density of the ink that may be employed may depend on the specific printing application, e.g., the density of the ink that makes the guide line may be selected according to the weigh scale printer.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

The invention claimed is:

1. A method of making a label, the method comprising the steps of:

providing a substrate having a front side and a back side, the back side comprising an adhesive;

deadening a first portion of the back side of the substrate to create a deadened first portion;

applying an ink to the deadened first portion;

contacting the adhesive on the back side of the substrate with a release liner; and forming a label having a front side and a back side, the back side of the label comprising:

the deadened first portion;

a second portion, the second portion proximate to the first portion and comprising the adhesive; and a third portion, the third portion proximate to the first portion and comprising the adhesive, wherein the second and third portions are separated by the first portion and by perforations between the first portion and second portion, and by perforations between the first portion and the third portion.

2. The method of claim 1 comprising the steps of:

perforating at least a portion of the interface between the first portion of the substrate and the second portion of the substrate; and perforating at least a portion of the interface between the first portion of the substrate and the third portion of the substrate.

3. The method of claim 2 wherein the step of forming the label comprises cutting through the substrate without cutting completely through the release liner.

4. The method of claim 1 wherein the ink defines printed information.

5. The method of claim 1 comprising applying ink to the front side of the substrate.

6. The method of claim 1 wherein the step of deadening comprises:

applying a ultraviolet-curable solution to the adhesive; and curing the ultraviolet-curable solution using an ultraviolet source.

7. The method of claim 4 wherein the printed information comprises a bar code.

8. The method of claim 4 wherein the printed information comprises a recipe or a coupon.

9. The method of claim 7 wherein the printed information comprises a recipe or a coupon.

10. The method of claim 5 wherein the ink defines printed information.

11. A method of making a label, the method comprising the steps of:

providing a substrate having a front side and a back side, the back side comprising an adhesive;

deadening a first portion of the back side of the substrate to create a deadened first portion;

applying an ink to the deadened first portion;

contacting the adhesive on the back side of the substrate with a release liner;

perforating the interface between the first portion of the substrate and the second portion of the substrate;

perforating the interface between the first portion of the substrate and the third portion of the substrate; and forming a label having a front side and a back side, the back side of the label comprising:

the deadened first portion;

a second portion, the second portion proximate to the first portion and comprising the adhesive; and a third portion, the third portion proximate to the first portion and comprising the adhesive, wherein the second and the third portions are separated by the perforations and the first portion.

12. The method of claim 11 wherein the step of forming the label comprises cutting through the substrate without cutting completely through the release liner.

13. The method of claim 11 wherein the ink defines printed information.

14. The method of claim 13 wherein the printed information is a bar code.

15. The method of claim 14 wherein the printed information comprises a recipe or a coupon.

16. The method of claim 13 wherein the printed information is a recipe or a coupon.

17. The method of claim 11 comprising applying ink to the front side of the substrate.

18. The method of claim 17 wherein the ink defines printed information.

19. The method of claim 11 wherein the step of deadening comprises:

applying a ultraviolet-curable solution to the adhesive; and curing the ultraviolet-curable solution using an ultraviolet source.

* * * * *